United States Patent [19]

Perna et al.

[11] 4,389,658

[45] Jun. 21, 1983

[54] INK JET ARRAY

[75] Inventors: Theodore P. Perna, Garland; Curt R. Raschke, Dallas; William L. Baker, Jr., Lewisville, all of Tex.

[73] Assignee: Xerox Corporation, Stamford, Conn.

[21] Appl. No.: 364,066

[22] Filed: Mar. 31, 1982

[51] Int. Cl.3 ............................................ G01D 15/18

[52] U.S. Cl. ............................................ 346/140 R

[58] Field of Search ........................... 346/1.1, 75, 140

[56] References Cited

U.S. PATENT DOCUMENTS 4,243,995 1/1981 Wright et al. ................ 364/140 PD

*Primary Examiner*—Donald A. Griffin

*Attorney, Agent, or Firm*—Richard A. Tomlin

[57] ABSTRACT

A pulsed liquid droplet ejecting apparatus array wherein rectangular piezoelectric transducers are arranged abaxially over ink-containing chambers. An edge of each transducer is fixed against a reaction block so that on excitation of the transducers, the transducers extend into the ink chamber ejecting a droplet. The ink chamber is formed in a relatively rigid material to increase the efficiency of utilization of the drive pulse.

1 Claim, 3 Drawing Figures

INK JET ARRAY

The invention relates to a pulsed liquid droplet ejecting apparatus wherein a piezoelectric, for example, transducer is arranged abaxially to an ink channel so that when the transducer is excited, it expands in the direction of the ink channel compressing it and the liquid therein. Specifically, the invention relates to an improved jet that can be individually manufactured, individually tested and, after testing, assembled into an array. The individual jets are designed to efficiently utilize the drive pulse and to reduce mechanical crosstalk between the jets when they are assembled and used in an array.

In a pulsed drop-on-demand liquid droplet ejecting system, such as in an ink jet printer, transducers are used to cause expulsion of ink as droplets from a nozzle or jet. An array of such jets is often utilized in high-speed, high-resolution printers. As is well known, the rate of printing and the resolution of the printed image depend on the droplet ejection rate and on the number of jets in the array. In typical arrays, a large number of jets are closely spaced in an array. The closer the jets are to one another in general, the faster the images can be produced and with higher image resolution.

One type of ink jet that is well suited for incorporation in such an array is that shown in U.S. Pat. No. 4,243,995, issued Jan. 6, 1981, to Allen T. Wright and Kenneth H. Fischbeck, and assigned to the assignee of this invention. In that arrangement, a rectangular transducer is aligned abaxially to an ink-containing channel. On application of a short electrical voltage drive pulse across the width of the transducer, the transducer expands into the ink-containing channel. Since the ink is incompressible, the transducer movement causes the ejection of a droplet from the ink channel, which droplet, on striking a record-receiving member, forms an ink spot thereon as is well known. An array of such jets suffers from a problem common to drop-on-demand ink jet arrays when the jets are "packed" closely together and that is that the movement of one transducer in response to its drive pulse can be transmitted to neighboring jets affecting the velocity of droplet ejection therefrom or, in the extreme case, causing spurious droplet ejection from unpulsed jets. Such crosstalk can affect the quality of the final image.

Two types of crosstalk are encountered in ink jet array systems. First, there is the transmittal of drive pulse pressure waves through the solid material in which the jets are encapsulated referred to herein as "mechanical crosstalk". Second, there is the transmittal of pressure waves through the common interconnecting fluid, for example, liquid ink supply system. This invention is concerned with reducing the first type of interaction or mechanical crosstalk. The jets of this invention are individually formed in rigid casings, which casings act both to reduce mechanical crosstalk between jets. To increase the efficiency of utilization of the drive pulse energy further, the ink channel is preformed of a relatively rigid material, which material also acts to transmit the drive movement from the piezoelectric member to the channel.

The invention is described below with reference to the drawing, which shows a preferred embodiment of the present invention.

The Figures are greatly exaggerated in size, and the various spacings, layers and members are not drawn to scale.

Figure 2:
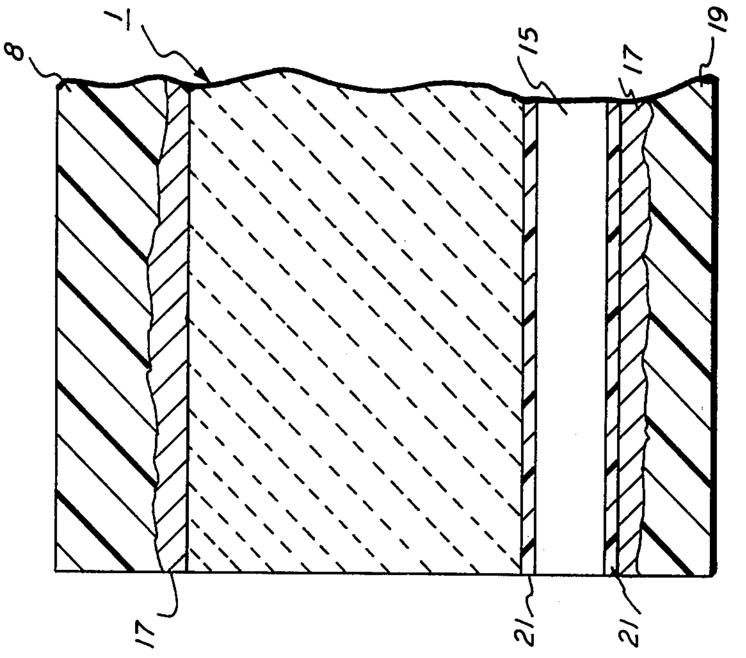
FIG. 2 is a side-sectional view of one of the jets in the array of FIG. 1 taken along line 2—2 in FIG. 1.
Figure 3:
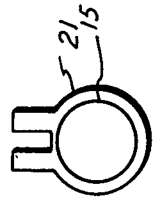
FIG. 3 shows an end view of the preformed channel of this invention.
Figure 1:
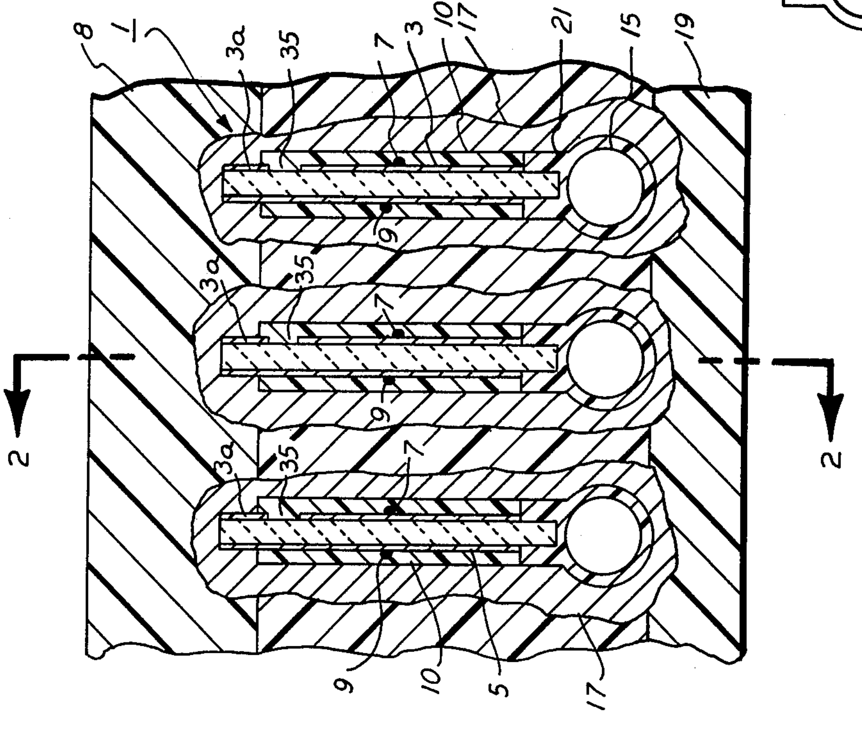
FIG. 1 is a cross-sectional end view showing how the ink jets of this invention are utilized in an array.

Referring now to the Figures, there is shown in FIG. 1 a cross-sectional end view of a three-jet section of a jet array. A typical array would comprise, by way of example, 20 or more individual such jets. Piezoelectric member generally designated 1 is coated on its sides with conductive electrode materials 3 and 5. An electrical voltage drive pulse generator (not shown) is connected to electrodes 3 and 5 by electrical leads 7 and 9, respectively. Piezoelectric member 1 is polarized in the direction from the surface on which electrode 5 is formed to the surface on which electrode 3 is formed during manufacture so that application of an electrical field in a direction opposite to the polarization direction causes the piezoelectric member 1 to become thinner as is well known. When this occurs, piezoelectric member 1 expands in height and length as explained in U.S. Pat. No. 4,243,995. Since piezoelectric member 1 is held rigidly by rigid casing 17 and reaction block 8, the expansion in height can only result in the movement of piezoelectric member 1 toward ink channel 15. The movement of piezoelectric member 1 also sets up pressure pulses in the body of the jet, which, if not absorbed or reflected, will be transmitted to neighboring jets causing loss of drive pulse energy and affecting the operation of neighboring jets. To prevent these pressure waves from traveling through the body of the array, the jets are encased in a rigid casing 17, which is preferably made by electroforming nickel over the coated transducer or piezoelectric member 1. The rigid casing 17 prevents the passage of pressure waves by minimizing deformation of the rigid casing 17 walls. The electroded piezoelectric member 1 is coated with elastomeric layer 10 to act as shear relief between piezoelectric member 1 and rigid casing 17. A preformed ink channel casing 21 is produced of a relatively rigid epoxy material and shaped such that it contains ink channel 15 and, being more rigid, acts as a more efficient transferor of drive pulse energy from piezoelectric member 1 to ink contained in channel 15 than prior art embodiments wherein the channels were formed in a more elastic or energy absorbing layer. A preformed ink channel casing 21 is produced by placing a pin of the dimension and shape desired for ink channel 15 in a suitable mold and filling the mold with Stycast 1267, a relatively rigid epoxy material available from Emerson & Cummings, Inc., Canton, Mass. A typical preformed ink channel casing 21 would have channel walls of about 4–5 mils, and the side walls contacting piezoelectric member 1 would be about 5–7 mils thick. The piezoelectric member 1, accordingly, would be held about 4–5 mils above the ink channel 15. The preformed ink channel casing 21 is of sufficient length to match the length of piezoelectric member 1. A piezoelectric member 1, which may be, by way of example, piezoceramic PZT-5, available from Vernitron Piezoelectric Division, Bedford, Ohio, which measures 0.25 mm thick by 5 mm high by 15 mm long and is available with poled electrodes, having electrodes 3 and 5 thereon, is placed in the preformed ink channel casing 21 with the pin still in it. Electrode 3 has a section removed forming gap 35. This gap is required to electrically isolate electrode 3 from electrode 5 once conductive rigid casing 17 is formed. The assembly is placed in a form, and the piezoelectric member 1, not in the preformed ink channel casing 21, is coated as shown with a 0.010 inch thick layer 10 of Silastic X3-6596, an elastomer available from Dow Corning. The purpose of layer 10 is to act as a shear relief material between piezoelectric member 1 and rigid casing 17. The encapsulated piezoelectric member 1, elastomeric layer 10 and preformed ink channel casing 21 are then coated with an electroformed layer of nickel approximately 0.02 inch thick. This is accomplished by suspending the individual jets in a bath of Barrett Sulfamate nickel plating solution, available from the Richardson Company, Allied Kelite Division. The surface tension of the bath is 30 dynes/cm with a pH of about 4.1. The bath temperature is 50° C. Plating time is about 18 hours at a plating current of about 0.14 ampere, with the bath being the anode. The pin is then removed to leave channel 15. The pin can be tapered to form a nozzle if desired. The individual jets are tested for satisfactory operation by filling the channels with ink and applying a drive pulse to the piezoelectric member. A potential application of about 50 volts at a frequency of about 8 kilohertz can be used by way of example. The velocity and volume of the expelled droplets are observed to determine acceptability. Normally the velocity of droplets expelled from a single jet would not be expected to vary more than ±10% from the average in the array. The successfully operating individual jets are then held together with alignment spacers leaving the upper ends free to be encapsulated with reaction block 8. Reaction block 8 may be, for example, Stycast 1267. The alignment spacers are then removed, and the jets encapsulated with Eccofoam FP, a polyurethane, available from Emerson & Cummings, Inc., Canton, Mass. This is a relatively flexible material, which allows for absorption of pressure waves generated by the individual jets, which escape the rigid casing. The array is then encapsulated with Stycast 1267 to provide array rigidity.

Although specific embodiments and components have been described herein, it will be understood by those in the art that various changes in the form and details may be made therein without departing from the spirit and scope of the invention. For example, piezoelectric member 1 could be replaced by an electroresistive or magnetostrictive member 1. Further, rigid casing 17 could be made by die casting, electroplating or using filled epoxies.

What is claimed is:

1. A fluid impulse jet in which a rectangular transducer is arranged abaxially to a fluid channel wherein said fluid channel is formed in a relatively rigid material, and the drive pulse from said transducer is transmitted through said relatively rigid material to said fluid channel.

* * * * *